United States Patent
Palacios (10) Patent No.: US 8,628,328 B2
(45) Date of Patent: Jan. 14, 2014

(54) SYSTEM, METHOD, COMPUTER PROGRAM AND DATA SET INTENDED TO FACILITATE THE COMPREHENSION AND/OR LEARNING OF LANGUAGES BY UTILIZING MODIFIED VERSIONS

(75) Inventor: Angel Palacios, Madrid (ES)

(73) Assignee: Linguaversal SL, Madrid (ES)

( * ) Notice: Subject to any disclaimer, the term of this patent is extended or adjusted under 35 U.S.C. 154(b) by 1379 days.

(21) Appl. No.: 10/597,519

(22) PCT Filed: Jan. 29, 2005

(86) PCT No.: PCT/ES2005/000037
§ 371 (c)(1),
(2), (4) Date: Jul. 31, 2008

(87) PCT Pub. No.: WO2005/073941
PCT Pub. Date: Aug. 11, 2005

(65) Prior Publication Data
US 2008/0286729 A1     Nov. 20, 2008

(30) Foreign Application Priority Data
Jan. 31, 2004 (ES) .................... 200400208

(51) Int. Cl.
*G09B 19/00*     (2006.01)

(52) U.S. Cl.
USPC ........................................ 434/156; 434/159

(58) Field of Classification Search
USPC .............. 434/156–185, 322–365; 706/11, 14; 704/1, 200
See application file for complete search history.

(56) References Cited

U.S. PATENT DOCUMENTS 6,077,085 A * 6/2000 Parry et al. ..................... 434/322
6,273,726 B1 * 8/2001 Kirksey et al. ................ 434/169

\* cited by examiner

*Primary Examiner* — Timothy A Musselman

(57) ABSTRACT

The invention relates to a system, method, computer program and data set which are intended to facilitate language comprehension and/or learning. For said purpose, samples of a target language are worked on and modified versions of said samples are used. The purpose of the modified versions is to provide clues which will enable the person using the invention to understand the target language samples. The invention greatly facilitates the management of the modified versions. In particular, the invention aids the tutor in the creation of modified versions and, in addition, in the identification of the versions most suited to the person interested in understanding and/or learning the target language. The modified versions are produced using sets of modifications, referred to herein as Relations, which are processed autonomously.

20 Claims, 3 Drawing Sheets

SYSTEM, METHOD, COMPUTER PROGRAM AND DATA SET INTENDED TO FACILITATE THE COMPREHENSION AND/OR LEARNING OF LANGUAGES BY UTILIZING MODIFIED VERSIONS

TECHNICAL AREA

The present invention belongs to the area of aid tools to develop the comprehension and/or learning of language in general, and of foreign languages in particular.

PRIOR ART

The following references show the prior art and also contain information and knowledge that have been used to develop the present invention:
[1] And: "AND Active English". Multimedia English course.
[2] Baker, M. C. (2001): "The Atoms of Language", Basic Books, New York.
[3] Barriere, C., Duquette, L. (2002): Cognitive-Based Model for the Development of a Reading Tool in FSL, "Computer Assisted Language Learning", Vol. 15, No. 5, pp. 469-481.
[4] Davis, D. D. (2002): "El Don de la Dislexia" (The Gift of Dyslexia), Editex, Madrid, 2000
[5] Doughty, C. (1991): Second Language Instruction Does Make a Difference, "Studies on Second Language Acquisition", 13, pp. 431-469.
[6] Dr. LANG group: "LANGMaster Courses". Multimedia English course.
[7] Gass, S. M., Mackey, A., Pica, T. (1998): The Role of Input and Interaction in Second Language Education, "The Modern Language Journal", 82, pp. 299-307.
[8] Gross A., Wolff, D. (2001): A Multimedia tool to Develop Learner Autonomy. "Computer Assisted Language Learning", Vol 14, No. 3-4, pp. 233-249.
[9] Hagoort, P., Brown, C., Groothusen, J. (1993): The Syntactic Positive Shift (SPS) as an ERP Measure of Syntactic Processing, "Language and Cognitive Processes", 8 (4), pp. 439-483.
[10] Hahne, A., Friederici, A. (1999): Electrophysiological Evidence for Two Steps in Syntactic Analysis: Early Automatic and Late Controlled Processes, "Journal of Cognitive Neuroscience", 11 (2), pp. 194-205.
[11] Kim, K. H. S., Relkin, N. R., Lee, K., Hirsch, J. (1997): Distinct cortical areas associated with native and second languages, "Nature", 388, 10 July.
[12] Krashen, S. (1980): The Input Hypothesis, en J. Alatis (Ed.), "Current Issues in Bilingual Education", pp. 144-158, Washington, D.C.: Georgetown University Press.
[13] Long, M. (1980): "Input, Interaction, and Second Language Acquisition", non published PhD dissertation, University of California, Los Angeles.
[14] Loschky, L. (1994): Comprehensible Input and Second Language Acquisition, "Studies in Second Language Acquisition", 16, pp. 303-323.
[15] Nieto, A., Santacruz, R., Hernandez, S., Camacho-Rosales, J., Barroso, J. (1999): Hemispheric Asymmetry in Lexical Decisions: The Effects of Grammatical Class and Imageability, "Brain and Language", 70, 421-436.
[16] Oh, S. (2001): Two Types of Input Modification and EFL Reading Comprehension: Simplification Versus Elaboration, Tesol Quarterly, Vol. 35, No. 1, Primavera 2001.
[17] Ortiz, T., Fernández, A., Maestu, F., Amo, C., Sequeira, C. (1999) "Magnetoencefalografía", Center of Magnetoencefalography Dr. Pérez Modrego, Universidad Complutense de Madrid.
[18] Palacios, A. (2003): Patent application ES200302943.
[19] Palacios, A. (2004): Patent application ES200400030.
[20] Pinker, S. (1999): "Words and Rules", London: Weidenfeld & Nicholson.
[21] Streb, J., Rösler, F., Hennighausen, E. (1999): Event-related responses to pronoun and proper name anaphors in parallel and nonparallel discourse structures, "Brain and Language", 70, pp. 273-286.
[22] Transparent Language. "Learn Italian Now". Multimedia Italian Course.
[23] VanPatten, B. (1996): "Input Processing and Grammar Instruction", Ablex Publishing Corporation, Norwood, N.J.
[24] Yano, Y., Long, M. H., Ross, S. (1994): The Effects of Simplified and Elaborated Texts on Foreign Language Reading Comprehension, "Language Learning", 44:2, June, pp. 189-219.

Translation Note: The language examples in this document have been developed for the Spanish language. The examples will be translated into English whenever the structural features of the example also exist in English. In the cases in which direct translation is not possible, the Spanish example will be maintained, and word by word literal translation will be provided. This literal translation will be shown below the original Spanish text and will be enclosed by parenthesis.

Language learning is a pressing need in current society but, in spite of that, there do not exist methods that can satisfy it efficiently. Both teachers and learners are still wanting for the solution to this problem. And this is happening despite the fact that a lot of scientific and technical knowledge has been created in the last fifty years about how the brain manages language.

The last years have witnessed a great increase in the technical character of the research on language. Numerous technical and scientific resources are being used in order to understand the brain processes that are related to the learning and working of native and second languages. In this respect, experiments are being carried out with electroencephalograms, functional magnetic resonance, positron emission tomography (PET), and magnetoencephalographs. These experiments have shown that concepts such as "verb", "sentence", "semantics" etc. are associated to well defined and sophisticated electrophysiological process. For example, in one of these experiments, Streb and his colleagues have shown that the electrophysiological processes of the brain depend on the grammatical categories that are being processed [Streb et al, 1999]. Other references that describe the brain processes that are related to different aspects of language are the following ones: [Pinker, 1999], [Hagoort et al, 1993], [Hahne and Friederici, 1999] y [Nieto et al, 1999].

In relation to second language learning, Kim and his colleagues used functional magnetic resonance images to show that, when individuals speak a second language, those persons who have learned it during adulthood use different brain areas than those individuals that have learned it during childhood [Kim et al, 1997].

The conclusion of this analysis is that the goal in second language learning should be to develop systems and methods that help the learner to develop neurological structures that are similar to the neurological structures that native speakers have. This will allow the second language learner to have a command of the second language similar to that of the native speaker.

In this respect, recent research on dyslexia has shown that with certain psycholinguistic training it is possible to change the neurological structures that individuals use in order to produce language [Ortiz et al, 1999].

In order to help the language learner develop neurological structures which are similar to those of the native speakers it is necessary to train those neurological structures. In order to do that, it is necessary for the learner to use those structures during learning. This is the reason why it is important that the learner does not use translation in order to comprehend, because translation utilizes different brain resources. However, normally, many learners use translation in order to understand the linguistic messages that they receive.

The comprehension of messages that are perceived in the target language is essential for learning, as modern research on language acquisition maintains. The problem is how to comprehend language samples of a target language without utilizing translation. In what follows, the relation between comprehension and learning of a target language will be explained in more detail, so that the invention of this patent application can be better described.

The two main hypothesis about the influence of comprehension in language learning are the content hypothesis [Kristen 1980] and the content and interaction hypothesis [Long 1980], [Loschky 1994].

In general terms, the content hypothesis maintains that language learning is based on comprehending messages that are generated in that language, which will allow to develop the ability to associate form and meaning. This association ability is the basis for language utilization. In this sense, it has been mentioned that children will only manage to make progress in breaking the code of a language if they somehow have access to what the sentences that they are listening to mean [Baker 2001, p. 224].

The content and interaction hypothesis maintains that the best way to comprehend messages is by interacting and generating clues that facilitate comprehension. This hypothesis is an extension of the content hypothesis. In this respect, Baker says, referring to television, that a media that is rich in content but poor in interaction fails in this aspect, because it does not provide enough visible indications to children about what the characters on the screen are saying [Baker 2001, 225].

Moreover, the language samples on which the user is working must contain linguistic aspects that the user does not know. Yano et al mention that if the learner does not receive linguistic aspects that are new, she/he will not have the opportunity to learn them [Yano et al 1994]. In this line of thought, Gass mentions that it is non comprehensible messages what can generate the recognition that there is a gap between the linguistic competence of the learner and the characteristics of the target language, and that therefore it is necessary to somehow reorganize the linguistic competence [cited in Gass et al 1998].

Therefore, in order to facilitate learning, it is necessary for the user-learner to perceive and comprehend samples of the language that she/he wants to learn, and these samples must contain linguistic aspects that have higher complexity than what the learner already masters. In order for the learner to comprehend these linguistic aspects that she/he does not know, the best situation is one in which the learner interacts with the environments and generates clues about the meaning of those samples.

A system that facilitates such comprehension and that can be applied to all type of texts is specially useful for foreign language learning, because it allows the learners to work with authentic texts. Authentic texts are language samples that have been generated to satisfy a communicative or informative need in the community of native speakers of the language in which the texts have been created. Foreign language teachers are of the opinion that authentic contents are very useful, because they increase the motivation of the leaner and also because they contain those linguistic structures that are used in real life.

Even though there are several approaches about to how to assist the user to better comprehend language, all of them have limitations. Those significant references that have been found can be organized in the following four groups, depending on what means they use:

1. Group a. These approaches provide general indications and strategies. [Gross, 2001] and [Barriere et al 2002] belong to this group. The problem with these two references is that they are still in development, and they do not provide concrete proposals.
2. Group b. These approaches provide translations of the target language sample. [Transparent Language] [And] and [Dr. LANG group] belong to this group. The problem with these proposals is that they only provide translations, so that the possibility of associating form and meaning in the foreign language does not exist.
3. Group c. These approaches provide some type of representation of the structure of the sample of target language. [Doughty, 1991] belongs to this group. The main problem of this reference is that it does not provide a mechanism that can be generalized to all type of texts.
4. Group d. These approaches provide modified versions about the target language, which can be either elaborations or simplifications. [Yano et al 1994], [Oh 2001] and [Loschky 1994] belong to this group. The advantage of modified versions is that it is easier for the user to comprehend them than it is to comprehend the original versions. The main disadvantage of these references is that the process to manage modified versions is not systematic.

As has been seen, in general, systems do not exist that facilitate the comprehension of samples of a target language in an effective way. One of the reasons is the difficulty to create a system that can be used in a systematic way with any type of text. Such a system does not exist yet, despite the fact that it would be extremely useful for language teachers and for learners.

It is necessary to develop inventions that facilitate creating these systems. The fact that these systems do not exist, despite the fact that it is known that they would be very useful, shows that the system that is proposed in this patent application requires a significant inventive effort.

EXPLANATION OF THE INVENTION

Introduction

The goal of the invention is to facilitate the comprehension and/or learning of languages with an enhanced system to produce, manage and utilize modified versions. The invention is used in such a way that the user goes through certain language samples and works on certain fragments in order to understand them. In this invention, in order to facilitate the exposition, each fragment on which the user is working is called Original Extract.

In this invention, modified versions of the Original Extracts are shown to the user, so that such modified versions facilitate the comprehension of such Original Extract. In this document, such modified versions are called Modified Extracts. The number of Modified Extracts that are presented to the user for each Original Extract will depend on the comprehension difficulty that the Original Extract presents. It might be possible that for an Original Extract there exists no Modified Extract and that for a different Original Extract there exists a high number of Modified Extracts.

In order to facilitate the exposition and without limitative effects, in what follows it will be assumed that, even though for an Original Extract there might be several Modified Extracts, only one is shown to the user at each particular time. The Modified Extract that is shown to the user at a particular time is called Current Extract. It is also assumed that the user can simultaneously inspect the Original Extract to use it as a reference and compare it with the Modified Extract.

Essence of the Invention

The essence of the invention is to manage the different modified versions by means of modifications, where some of these modifications can be applied in an independent fashion. That is, in the invention there exist several possible modifications, and some of these modifications can be applied independently in order to generate the different Modified Extracts.

In some cases, it will not be possible to apply some of these modifications in an independent way, depending on the design that is applied to the invention, but this does not limit the advantages nor the nature of the invention. For example, several modifications can be linked in a higher order modification that might require the simultaneous application of the modifications that belong to it. For example, this could be the case if the purpose of a modification is marking a word, and the modification is made up of two constituent modifications, one of which turns the format of the word into bold font and the other one turns it into underlined font.

The approach of the invention is different from current approaches. In the current approaches, the focus is put on developing the different full modified versions, rather than on the different individual modifications that generate the modified versions.

As will be seen, the present invention also allows to implement a number of optional functions that very much facilitate the process of generation and management of modified versions, as is described in the section in which the preferred embodiment is explained. These advantages provide benefits both to the tutor who is in charge of preprocessing the language samples and to the learner.

In this invention, the modifications that are managed in an independent way are called Relations. In general, Relations contain information about different aspects of the Original Extract, and about the modifications that can be applied to it in order to make it more comprehensible. For each Original Extract there might exist a plurality of Relations, and the number of Relations will depend on the complexity of such Original Extract.

In the simplest case, Relations have two activation levels, which correspond the active and non-active states. In this case, when a Relation is active, the modification contained in the Relation is applied to the Original Extract, and a Modified Extract is generated. When a Relation is non-active, the modification is removed from the Modified Extract.

In the most general case, a Relation might have more than two activation levels, and there will be a different modification for each activation level. When the Relation is activated to its successive possible levels, the modifications that belong to the different levels will be incrementally applied, yielding different Modified Extracts.

Exhibits 1, 2 and 3 show some examples that clarify how Relations are used. For the time being, the only part that is described is what is presented to the user. Later on in this document the processes to manage the data that make up the Relations will also be explained.

In the example of Exhibit 1, the Original Extract presents a comprehension problem for a language learner, because in the second coordinated sentence the verb "went" has been omitted. For this case, a Relation is created whose mission is to insert the word "went" in the appropriate position. In step 1, the relation is non-active, i.e. its activation level is "0", so the Current Extract coincides with the Original Extract. When Relation 1 is activated, in step 2, the word "went" is inserted in the Modified Extract. When Relation 1 is deactivated again, in step 3, the modification disappears and the Current Extract gets the form of the Original Extract.

Exhibit 1

Original Extract: John went to Paris and Mary to Chicago

| Step | Configuration | Current Extract |
|---|---|---|
| 1 | Relation 1, level 0. | John went to París and Mary to Chicago |
| 2 | Relation 1, level 1. | John went to París and Mary (went) to Chicago |
| 3 | Relation 1, level 0. | John went to París and Mary to Chicago |

In Exhibit 2 there is a comprehension problem because the word "Juan", which is the subject of the verb "ha venido", is postponed behind the verb. This might create a comprehension problem because in Spanish the canonical order is Subject-Verb-Object, and also because in general the user might expect this Subject-Verb-Object order for any reason (even if it is in a language in which it is not the canonical order)

In order to solve this problem, a Relation is created that has two activation levels.

1. Activating the Relation to level 1 will insert the character string "[@]" in the position that the subject of "ha venido" would occupy if the structure was the canonical structure. In these circumstances, the learner would see that the verb "ha venido" actually has a subject, which should be in the position of the character string "[@]", but which is located in a different position in the sentence.
2. Activating the Relation to level 2 will replace the character string "[@]" with the actual subject "Juan". Now, the learner would see the subject placed in its canonical position.

Exhibit 2

Original Extract: Pepe ha preguntado si ha venido Juan
(Pepe has asked whether has come John)

| Step | Configuration | Current Extract |
|---|---|---|
| 1 | Relation 1, level 0. | Pepe ha preguntado si ha venido Juan |
| 2 | Relation 1, level 1. | Pepe ha preguntado si [@] ha venido Juan |
| 3 | Relation 1, level 2. | Pepe ha preguntado si (Juan) ha venido |

In this invention, the characters that are used to indicate positions, such as "[@]" in the previous example, are called Localizers. Depending on the actual embodiment, the localizers can be surrounded by certain separating characters, such as the brackets in the previous example.

The content of the Localizers could be non alphabetic characters, such as in the previous case, or could be real words of the target language. The latter could happen, for example, in cases in which it is necessary to move a first word and the destination position is closely related with a second word, in which case the second word might act as a Localizer.

Exhibit 3 shows an Original Extract that is more complex than the ones that have been shown thus far. In this case, the complexity has to do with the fact that there are two aspects that are simultaneously causing comprehension problems: the subjects of the verbs "Es" and "venga" are not located in their canonical positions. In order to create modified versions that take both aspects into account, two Relations that move word groups are created. A difficult issue in this respect is that the two word groups that must be moved (by each Relation) are sharing a word.

Relation 1 is about the verb "Es" and its subject: "que venga Juan". Relation 2 is about the verb "venga" and its subject: "Juan".

When Relation 1 is activated to level 1, the Localizer "[+]" is shown in the position that the subject of "Es" should occupy, so this modification will indicate that the verb "Es" has a subject and that it is located somewhere in the sentence. When Relation 1 is activated to level 2, the subject of "Es" is moved to replace the Localizer "[+]".

Relation 2 operates in a similar way. When this Relation is in level 1, the Localizer "[@]" indicates the position that the subject of "venga" should occupy. When the Relation is activated to level 2, the actual subject replaces the Localizer "[@]".

The invention facilitates to efficiently manage all these modifications. Because there are two Relations and each Relation has three possible levels, in total there might be nine possible modified versions. With the invention, it is not necessary to create nine different sentences, because only one sentence is created that can potentially adopt nine different forms.

Exhibit 3

Original Extract: Es estupendo que venga Juan
(Is great that come John)

| Step | Configuration | Current Extract |
|---|---|---|
| 1 | Relation 1, level 0. Relation 2, level 0. | Es estupendo que venga Juan |
| 2 | Relation 1, level 1. Relation 2, level 0. | [+] es estupendo que venga Juan |
| 3 | Relation 1, level 2. Relation 2, level 0. | Que venga Juan es estupendo |
| 4 | Relation 1, level 2. Relation 2, level 1. | Que [@] venga Juan es estupendo |
| 5 | Relation 1, level 2. Relation 2, level 2. | Que Juan venga es estupendo |

As has been seen before, in general terms, the modifications are generally carried out by adding words, removing words, modifying words or moving words.

Optional Aspects of the Invention

The invention contains several optional aspects. Some of them are succinctly described here, and some of them will be described in more detail in the exposition of the preferred embodiment.

On the one hand, several optional functions can be added for selecting and activating Relations, which are explained together with the preferred embodiment.

Also, several graphical means can be used to emphasize different parts of the Extracts, as is done in some examples.

The Localizers can be used with different types of characters, in addition to the characters "@" y "+". In general, it would be advisable to always use the same type of character for the same type of grammatical structure.

Moreover, the invention can be integrated with other proposals for language learning, such as for example the proposals explained in the patent applications [Palacios 2003] and [Palacios 2004] given that these inventions have been developed at the same time.

Comments about the Invention

The invention can be used to help the user to learn a target language, or simply to help her/him to comprehend the target language, or for both goals.

The invention can also be used for helping individuals that might have problems to fully utilize their own native language. Dyslexic individuals, for example, seem to suffer several problems which are similar to the problems that foreign language learners have, such as for example difficulties in the comprehension of functional words (functional words are those whose purpose is not to transmit a meaning in itself, but to assist in the global processing of the sentence; for example, in "the dog", "the" is a functional word and "dog" is a lexical word, which does have a meaning by itself [Davis 2002], [VanPatten 1996].

In order to use the invention, the tutor must have processed the target language samples. This processing comprises the steps of defining the Original Extracts, modifying the Original Extracts in an appropriate way, and creating the appropriate Relations for each Original Extract. The result of this preparation will be a group of data that will be used as the basis for generating modified versions.

Many of the actions that the tutor performs in order to process the target language sample could be performed automatically. However, in order to facilitate the exposition, in this document it will be assumed that all the actions are carried out by the tutor manually.

Advantages of the Invention

The present invention has several advantages over the references that were mentioned in the Prior Art section. The main advantages are the following ones:

1. It helps the learner in using modified versions

In contrast to the existing proposals in the prior art, this invention facilitates that the user learner interacts with language. Given that the modifications can be applied at will and independently, the user can follow her/his own path in activating modifications, so that it is easier for her/him to detect what aspects of the Original Extract cause problems, which ease the task of finding the modifications that can better solve them.

2. It helps the tutor in preparing the modified versions

The tutor has only to generate the different Relations, instead of creating numerous modified versions for the same sentence. In the usual approaches, it is necessary to create as many modified versions as the number of combinations of the possible modifications. For example, if there are three Relations and each Relation has three possible activation levels, the total number of Modified Extracts would be 27. Using the present invention, it would be necessary to create only one Extract, which would be automatically modified to cover those 27 possibilities. Similarly, if the tutor wants to add a new Relation, which also has three activation levels, the traditional approach would require rewriting three times those 27 previous modified versions. However, with the present invention, it is only necessary to add a new Relation.

Besides that, as will be explained in the description of the preferred embodiment, the tutor can use the invention in a highly systematic way in order to create modified versions, based on the identification of individual modifications.

Furthermore, the individualized and automatic fashion in which Relations and modified versions are managed allows to easily test different types the modifications, to check how useful they are for the user learners. This would allow to choose the most appropriate set of modifications for each learning level.

EXPOSITION OF AN EMBODIMENT OF THE INVENTION

Exposition of the Preferred Embodiment
General Description
Physical Support

Figure 1:
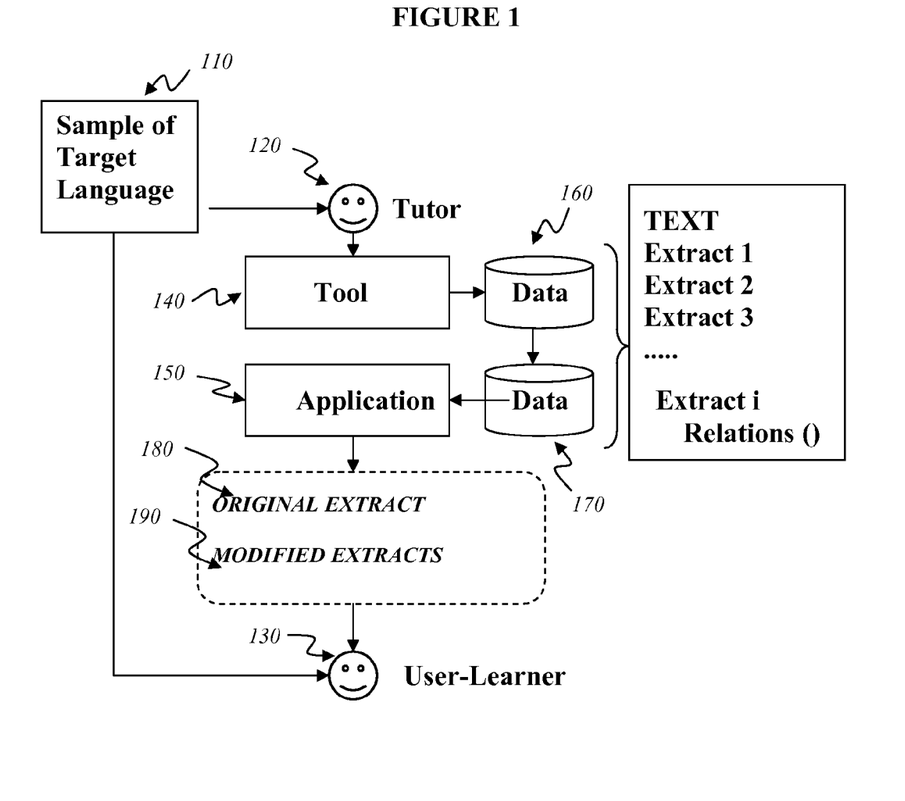
FIG. 1 shows a general scheme of the preferred embodiment, which is based on two computerized systems, the Tool and the Application.

As shown in FIG. 1, in the preferred embodiment, the invention is built by using two systems 140 and 150, both of them being computerized systems. System 140 is called Tool, and it will be used by the tutor 120 to create the Relations that will later on generate the modified versions. System 150 is called Application, and the user learner 130 uses it to work on the target language samples 110.

Systems 140 and 150 can be based for example on two Dell® Dimension XPS® computers, to which two mouses and two keyboards are added in order for the user to carry out the interactions with the system.

Each one of these systems contains an operating system, such as for example Microsoft® Windows 2000® and a database manager, such as for example Microsoft Access®.

Furthermore, each system contains a specific computer program that will manage the interactions performed by the person that uses it, either the learner or the tutor, and that will allow to create and process the Relations. Such programs can be created for example with the development environment Microsoft® Visual C++®.

Distribution of Samples of Target Language

Figure 2:
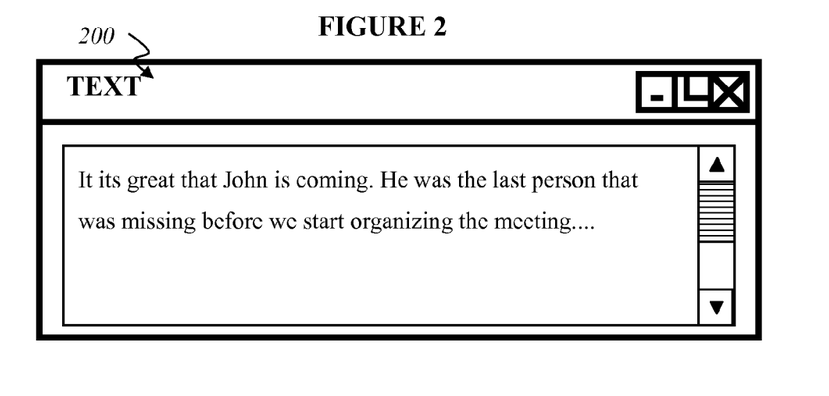
FIG. 2 schematically shows the window of the preferred embodiment in which the text is shown that corresponds to the sample of language on which the user is working at a given time.

The samples of target language 110, independently of what format they are in (text, audio, sign language . . . ), will be converted into text, and will be presented in a window. In the Tool they are presented to the tutor, and in the Application they are presented to the user learner. Such window is shown in FIG. 2 with an example text.

The tutor structures the samples of target language into Original Extracts in such a way that each Original Extract corresponds to a sentence. The Original Extracts are stored in a database that is accessible to the Tool, in a file 160, in such a way that each Original Extract corresponds to a record. Each such record contains the main data for each Original Extract, such as the start position and end position of the text, besides other data. There also exist a set of Relations which are stored in an array Relations( ). The file 160 is transferred to the data file 170 of the Application, in which it is accessible to the learner so that he/she can use it.

The Application shows the different Original Extracts 180 to the learner, and if so required, it also shows a plurality of Modified Extracts 190 for each one of such Original Extracts.

Figure 3:
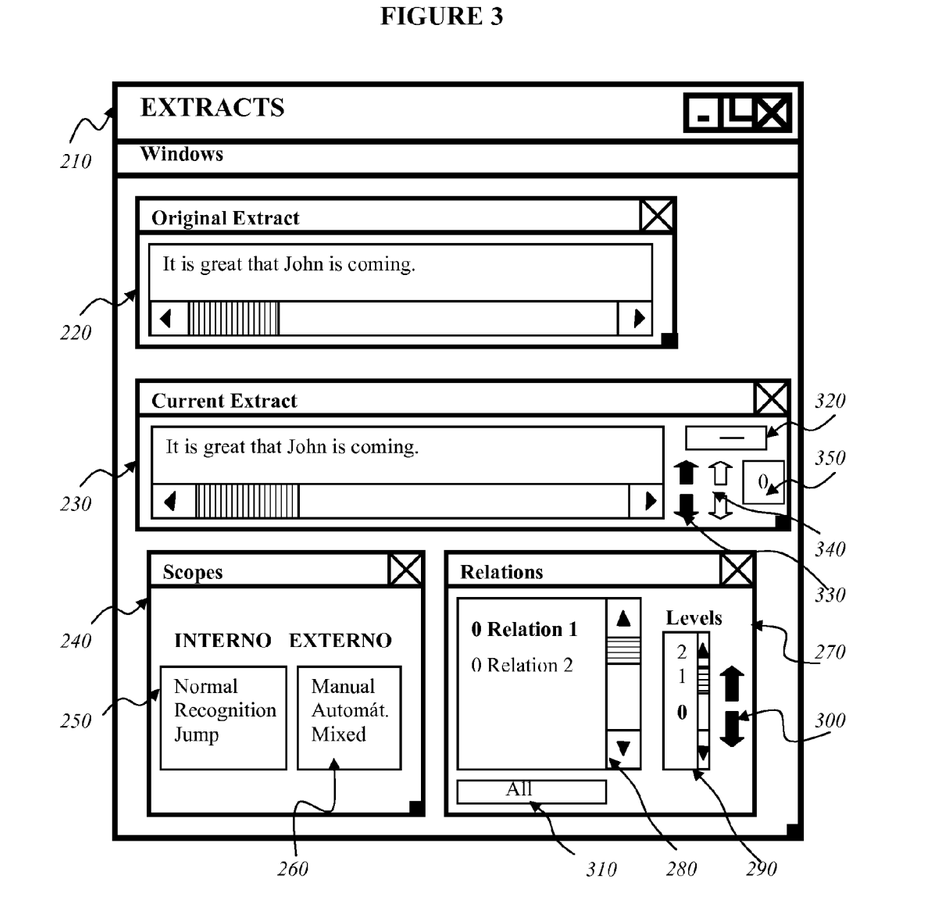
FIG. 3 schematically shows the window of the preferred embodiment in which the Original Extract and the Modified Extracts are shown. This window also contains several controls to manage the Relations.

The Application presents the required information to the user learner through several windows. One of these windows is the Text window, which has been shown in FIG. 2 and which allows to select the different Original Extracts. When an Original Extract has been selected, the Application shows it in the window Extracts 210, which is shown in FIG. 3. This window also exists in the Tool, with the purpose of assisting the Tutor in his/her work.

The Original Extract, which appears in the subwindow 220, will be used as a reference. The modified versions will be shown in the subwindow 230, which shows the Current Extract (i.e. the successive Modified Extracts). The Current Extract will initially have the same form as the Original Extract, but when the user activates a Relation, the Current Extract will change and will adopt the form of one of the Modified Extracts.

There also exist several subwindows, such as the subwindows 240 and 270, in which the user learner can interact and manage the Relations and modified versions, which will be described below.

As was mentioned, the window 200, which shows the text, is shown both in the Tool and in the Application. Both the tutor and the learner can select a word in the text, and the system will use that selection in order to identify the Original Extract to which it belongs and present the windows and subwindows that are associated to it.

Selection of Relations

In window 210 there exist two subwindows intended to manage the existing Relations. In subwindow 270 there exist several controls, one of which is control 280, which shows a list of Relations. In control 280, the Relations that are selected at a given moment are emphasized with some graphical means, which in the current case is bold font. At the left of each Relation, there appears a number that indicates the current activation level of that Relation.

Control 290 shows the possible activation levels that the selected Relation might have. The activation level that the selected Relation has at a given moment is emphasized with bold font. For the current data shown in the window 210 in FIG. 3, Relation 1 is the selected Relation, and it is not active.

Functions to Assist the Learner in Activating Relations

In the preferred embodiment, there exist certain special functions that facilitate utilizing the invention. There also exist different utilization modes, depending on what functions are used in each case. That is to say, in each mode one of these functions can be used. Those modes are not described here in order to ease the exposition.

Recognition Function

This function is based on adding certain information that associates different fragments of some Extract and on graphically emphasizing some of those fragments when certain interaction takes place. For example, it is possible to encode into the system that a given fragment "A" and a given fragment "B" are associated by this function. Then, when the user selects fragment "A", the system will use certain graphical means to emphasize fragment "B" in order to show the association between both fragments.

In the preferred embodiment, the Recognition function is used with those Relations that move words, such as for example in the example that is shown in Exhibit 4. In step 2, when the user selects the character [@], the function will emphasize with bold font the selected character itself and will also mark with bold font the word "Juan", to indicate that this is the word that might take that position. In step 3, when the user clicks on "preguntado", the emphasis in the previous words is eliminated.

Exhibit 4

Original Extract: Pepe ha preguntado si ha venido Juan (Joseph has asked whether has come John)

| Step | Action | Current Extract |
|---|---|---|
| 1 | Initial situation | Pepe ha preguntado si [@] ha venido Juan |
| 2 | Click on "@" | Pepe ha preguntado si [@] ha venido Juan |
| 3 | Click on "preguntado" | Pepe ha preguntado si [@] ha venido Juan |

Jump Function

This function is based on adding certain information to the system that links the selection of certain fragments of the Current Extract with a change of level for some Relation. In the preferred embodiment this function is built in such as way that it contains two types of responses for different cases:

1. Response 1 takes place when the selection falls on a word or a group of words that are encoded to perform a level change in the Relation, so that such level change takes place. Response 1 is used in Relations that move words using a Localizer. In order to do that, an order is encoded that says that "every time a Localizer is selected, the Relation will be automatically activated to the next level".

2. Response 2 takes place when it happens that a group of words is selected and some of the words in the group them are not visible (for example a Localizer or another word). In this case, the Relations to which those hidden words belong get activated up to the required level to make those hidden words visible. This is only applied to hidden words that have the appropriate characteristics, as will be explained later.

Exhibit 5 shows how the process of response 1 would word for an actual example. In level 0, if the user selects "Juan", level 1 gets activated, so that the Localizer is shown and "Juan" is emphasized. In level 1, when the user selects the localizer "[@]", the Relation would get activated to level 2, so that "Juan" would replace "[@]".

Exhibit 5

Original Extract: Pepe ha preguntado si ha venido Juan (Joseph has asked whether has come John)

| Action | Activation State | Current Extract |
|---|---|---|
| Initial Situation | | |
| | Level 0 | Pepe ha preguntado si ha venido Juan |
| Selection on "Juan", Level 1 gets activated | | |
| | Level 1 | Pepe ha preguntado si [@] ha venido Juan |
| Selection on "@", Level 2 gets activated | | |
| | Level 2 | Pepe ha preguntado si Juan ha venido |

Exhibit 6 shows how to use Response 2 in the case of a Relation that moves words. The user could select the fragment "si ha venido", maybe because he or she has problems in comprehending the role of "ha venido". In this case, the invention would detect that there exists a hidden Localizer and in order to make it visible it would activate the Relation associated to Level 1.

Exhibit 6

Example Original Extract: Pepe ha preguntado si ha venido Juan (Joseph has asked whether has come John)

| Action | Activation State | Current Extract |
|---|---|---|
| Initial Situation | | |
| | Level 0 | Pepe ha preguntado si ha venido Juan |
| Selection on "si ha venido", Level 1 gets activated | | |
| | Level 1 | Pepe ha preguntado si [@] ha venido Juan |

Building and Processing of Relations for Creating Modified Versions

General Description

An important advantage of the invention is that it greatly facilitates the creation of modified versions. This is so because it allows to create modifications after a set of entities that are described in the following lines. In this section, a general introduction to those entities will be provided, and they will be described in greater detail in the next sections.

1. In order to generate modified versions (i.e. the Modified Extracts), Closed Extracts are utilized. Each Closed Extract is a text string that contains all the relevant data about an Original Extract and all the necessary data to generate the modified versions that can be generated for that Original Extract. In order to define the modifications that can be applied to an Original Extract, the tutor generates a set of Relations, as was previously mentioned.

2. In order to generate each Relation, the tutor uses certain entities called Relational Schemes. Basically, Relational Schemes are templates that help to define Relations. Relational Schemes contain certain variables that are related to the different characteristics of the Original Extract that is being worked on. The tutor generates the Relation assigning values to the variables of the Relational Schemes. One of these variables, for example, can be a given set of words of the Original Extract; in this case, the tutor would assign a group of words to that parameter.

3. In order to create Relational Schemes, Basic Actions are used. Basic Actions are simple modifications that can be applied upon certain word groups that are defined for each Relational Scheme.

In what follows, these concepts will be explained in more detail.

1. Generation of Modified Versions after the Closed Extracts

The generation of modified versions uses both the Open Extract and the Closed Extract. For each Current Extract (independently of whether it corresponds to an Original Extract or to a Modified Extract) there exist an Open Extract and a Closed Extract. They can be considered as different versions of the same Current Extract. That is to say, in the preferred embodiment, a Current Extract only exists in the form of a Closed Extract or of an Open Extract.

The Open Extract is the character string that is shown to the user learner. It is a normal text string in the target language, and it would present certain grammatical, pragmatic or stylistic comprehension problems.

The Closed Extract is the character string that contains the totality of the data related to the Extract upon which it is based. It includes all the words that are related to the Extract to which it is associated. When Relations are applied upon the Original Closed Extract, Modified Closed Extracts are generated. Any of the Closed Extracts can be used in order to generate the corresponding Open Extract. In order to do that, a filtering process is applied.

In the preferred embodiment, each Closed Extract is basically made up of a series of tagged words, which would be similar to the tagged texts in XML or HTML. Each one of those words comprises certain attributes, and the values of those attributes define the way in which those words must be processed in order to generate the Open Extract. For example, the word "car" might be represented as a character string such as the following one "<$x_1|x_2|x_3|x_4|x_5|$coche$|x_7|x_8|x_9|x_{10}|x_{11}|$>", where the "$x_i$" represent the values of the different attributes, and there might be an arbitrary number of attributes.

Generally, a two step process is followed in order to generate the different modified versions:
1. Activating the Relations that have been chosen, so that several modifications will be applied upon the Closed Original Extract, which yields several Closed Modified Extracts. When all the Relations are non-active, the Closed Current Extract will be the same as the Closed Original Extract.
2. Filtering one or more of those Closed Modified Extracts, to generate the corresponding Open Modified Extracts, which will be shown to the user.

In order to generate the Closed Extracts, the tutor starts using the Open Original Extract and uses the invention in order to label the words that make it up. She/he will also apply several changes to the Original Extract, and will add Relations, so that she/he will generate different Closed Extracts. In all this process, the invention allows to perform actions such as tagging, cutting, pasting, editing, and so on, in a similar way as how it can be done upon HTML or XML text.

2. Building Relations after the Relational Schemes

As was mentioned, in the preferred embodiment, Relations are built using Relational Schemes. A Relational Scheme contains the following elements:
1. Variables, to which some values must be assigned. These variables can be groups of words on which certain modifications can be applied, or can also be options about how those modifications are to be applied.
2. Modifications, which belong to the Relational Scheme, which are those modifications that, when the Relation is activated, will be applied over specific words.

Relational Schemes greatly facilitate the construction of modified versions by the tutor. When a tutor finds a new comprehension problem for which no Relational Scheme exists, he/she can use the invention to create a new Relational Scheme, as will be explained later. That Relational Scheme then would be added to the system and would be available to the tutor or to other tutors for the future.

Figure 4:
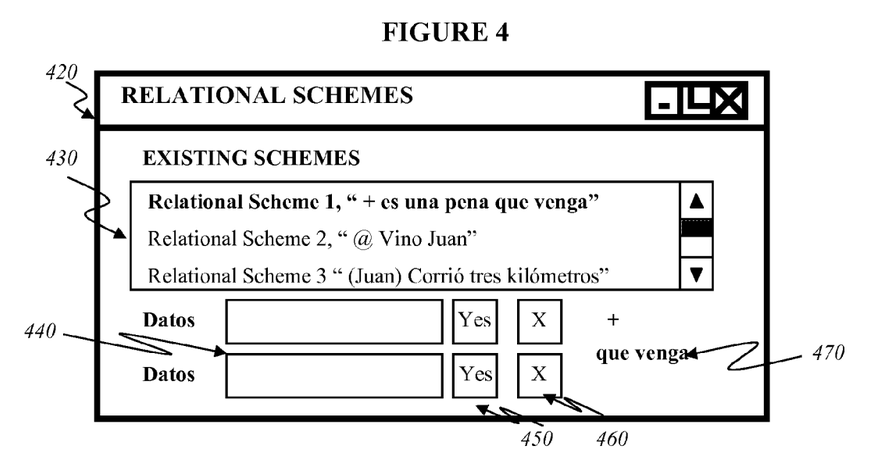
FIG. 4 shows the window of the preferred embodiment that is used in the Tool to create Relations by using Relational Schemes. The sentences shown in the Figure are the following ones: "Es una pena que venga" (Is a pitty that comes); "Vino Juan" (Came John); "(Juan) corrió tres kilómetros" ((John) ran three kilometers).

In the preferred embodiment, when the tutor inspects the Original Extract in the Tool, there will exist a window 420 in which all the Relational Schemes will be defined, and which will contain different tools to create Relations, as shown in FIG. 4.

3. Building Relational Schemes after Basic Actions

In the preferred embodiment, the Relational Schemes are built after simpler entities called Basic Actions. Basic Actions are individual operations that can be applied upon a word or a group of words.

A Relational Scheme is based on the application of the Basic Actions that are assigned to that Relational Scheme upon the word groups that have been chosen. In the preferred embodiment, in order to create a Relational Scheme, it is necessary to follow these steps, or other similar ones:
1. Choosing the number of activation levels that will exist for the Relations that are based on that Relational Scheme.
2. For each level, defining which Basic Actions will be applicable.
3. For each Basic Action, indicating the configuration parameters of the Basic Action. These configuration parameters can include the type of font format that can be applied to emphasize text, the characters that will be used to mark text (such as quotation marks, for example), the Localizer word that will be used for movement actions, and other ones that might be necessary.

A Relational Scheme is codified and stored as a character string. Exhibit 7 shows an example of a possible Relational Scheme. In the example, "X1" and "X2" represent chains of word codes.

Exhibit 7

Normal Displacement:
1_Show_X1/Mark_X1_[_]/Jump_X2
2_Move_X2_X1/Jump_X2_X1
3_Recognition_X1_X2

Those relations that are based on this Relational Scheme would have two activation levels:
1. When activating to the first level, two Basic Actions are performed:
   Action "Show", upon the words referred to by the code chain X1,
   Action "Mark", upon the words referred to by the code chain X1; for this particular case, brackets will be used to mark the word group (as indicated by the brackets shown in Exhibit 7)
2. When activating the second level, a Basic Action is performed: the words referred to by the code chain X2 are moved to the position next to the chain code X1.

Besides that, this Relational Scheme contains a Recognition Function, which is encoded and stored as a third level. This function indicates that if one of the words of the code chain X1 is clicked on, the system must mark the words that are associated to the code chain X1 and those that are associated to the code chain X2.

In this Relational Scheme, there are also two Jump functions:

A Jump function generates the activation Level 1. That is to say, in Level 0, if the user clicks on one of the words that are included in X2, the Relation will be activated to Level 1.

A Jump function generates the activation Level 2. That is to say, in Level 1, if the user clicks on one of the words that are included in the code chain X1, or on one of the words in the code chain X2, the Relation will be activated to Level 2.

Encoding and Storing Relations

In the preferred embodiment, each Relation is encoded into a text string. That string contains the words that the Relation can modify, the modifications that can be applied upon them, and the way in which those modifications will be executed. An example of those text strings is shown in Exhibit 8.

Exhibit 8

1_Normal Displacement_8-9-10_12

In the Relation shown in Exhibit 8, the following components exist:

The code or index of the Relation: "1",

The type of Relational Scheme in which it is based, called "Normal Displacement".

Those words that must be moved, which are the words that have codes "8", "9" y "10".

The Localizer, which is the word whose code is "12".

Compounded Relations

In the preferred embodiment there also exist Compounded Relations, which are built by combining two or more preexisting Relations. That is to say, there exist Simple Relations, which are directly based on Relational Schemes, and Compounded Relations, which are based on a combination of other preexisting Relations.

In the preferred embodiment, all the Relations that belong to a Compounded Relation must have the same number of activation levels. If this was not the case, the number of activation levels of the Compounded Relation would be equal to the number of activation levels of the Relation that has the lower number of activation levels.

In general, Compounded Relations can be used, for example, for performing multiple displacements, such as for example in the English sentence "Only then will you find that money cannot be eaten", which could be transformed into "You will find that money cannot be eaten only then". In order to do it, two Relations moving the fragments "Only then" y "will" would be integrated into a compounded Relation.

Some Existing Relational Schemes

In the preferred embodiment there exists a set of predefined Relational Schemes. In order to keep the exposition simple, only some of them will be described in this section. The different Relational Schemes that are described have been developed for Spanish. However, these or other Relational Schemes can be used for other languages. It is understood that an expert in languages and informatics can create many other Relational Schemes, besides the ones shown here, that would also be included with the scope of the invention. It is also understood that choosing the appropriate Relational Schemes is a design matter.

The different Relational Schemes that are described will be aggregated into different groups that share some feature in common.

For each Relational Scheme an example will be shown. The example will be based on a number of Open Extracts. A Relation that is based on that Relational Scheme could be applied to the example Open Extracts. These Open Extracts are distributed in vertical form. Some numbers will appear on their left. Those numbers indicate the activation level of the Relation that is being applied to create the Open Extract that is shown in the same line.

For example, Exhibit 9 shows an example for the Original Extract "John went to Paris and Mary to Chicago". The first line, with number "0", corresponds to the situation in which the Relation is non-active and the second line, with number "1", corresponds to the Extract in which the Relation is active at level "1".

Exhibit 9

0. John went to Paris and Mary to Chicago
1. John went to Paris and Mary (went) to Chicago Relational Schemes of "Visualization" Type: The purpose of this group of Relational Schemes is to show words that are omitted from the Original Extract. In the preferred embodiment, there exist two Relational Schemes of this type, such as is shown in Exhibit 10.

1. The Relational Scheme "Visualization 1" corresponds to cases in which visualizing the omitted words yields as a result a text with a high degree of correction.
2. The Relational Scheme "Visualization 2" corresponds to cases in which visualizing the omitted words is clearly incorrect. As can be seen, the difference between both Relational Schemes lies in the characters that are used in order to mark the words that are visualized.

Exhibit 10

| Visualization 1 |
| --- |
| 0. John went to Paris and Mary to Chicago |
| 1. John went to Paris and Mary (went) to Chicago |
| Visualization 2 |
| 0. John got home and read the newspaper. |
| 1. John got home and [John] read the newspaper. |

Relational Schemes of the "Specialization" Type: The purpose of this group of Relational Schemes is to indicate that there exist certain groups of words or certain fragments of words that have a special function or a special characteristic. The groups of words or word fragments can be marked with special marks, so that the user learner would understand that that part of the text has a special function. In the preferred embodiment, there are two particular Relational Schemes, shown in Exhibit 11, which are applied upon different types of pronouns.

Exhibit 11

| Specialization 1.1 |
| --- |
| 0. Juan la ha pintado |
|    (John it has painted) |
| 1. Juan -la- ha pintado |
| Specialization 1.2 |
| 0. Juan quiere pintarla |
|    (John wants to paint-it) |
| 1. Juan quiere pintar-la |

Relational Schemes of the "Association" Type: The function of this group of Relational Schemes is to show the user learner that there exist certain words in the Extract that are related to each other in a direct way. In Spanish, this Relational Scheme can be used for pronominal verbs. Exhibit 12 shows that there exist two Relational Schemes for this type, each of which is related to different ways in which pronominal verbs can be used.

Exhibit 12

Basic Association 1

0. Aquí se come bien
   (Here eat well)
1. Aquí #se# come bien
2. Aquí #se# #come# bien Basic Association 2

0. Es importante comportarse bien
   (Is important behave well)
1. Es importante comportar#se# bien Existing Basic Actions The following Basic Actions have been defined for the preferred embodiment:

Show: The effect of this Action is to make a word or word group visible in the Current Extract. The information that is required for this Action is the word or words that the Action will make visible.

Mark: This Action adds two marks, one on each side of the indicated word or words, such as for example parenthesis, brackets etc. The information that is required for this Action is the word or words that are affected by the Action, and the characters that will be used as marks.

Emphasize: This Action changes the font format of the indicated word or words. The information that is required for this Action is the word or words that are affected by the Action and the format that must be applied.

Move: This Action moves words to a different position. The destination position will be adjacent to the position of a Localizer. The information that is required for this Action is the word or words that are affected by the Action and the word that acts as Localizer.

Some Basic Actions can be very similar to some Relational Schemes. The main difference among them is that the Relational Schemes might contain several Basic Actions. That is to say, a Relational Scheme that executes a displacement can be based for example on the combination of the following Basic Actions: Action "Show", in order to show the Localizer, Action "Mark", in order to mark the localizer, and Action "Move" to move the words that are involved to the position of the Localizer. Each one of these Actions can be refined by making particular choices for the Localizer and the marks.

Executing "Move" Basic Actions

An important technical aspect when applying a Relation is to keep control of the changes that are made with "Move" Basic Actions. In order to do that, in the preferred embodiment the following steps are performed:

1. When Closed Extracts are created, a Localizer is inserted into the destination position to which the relevant words will be moved. That is to say, a tagged word will be inserted whose function is to indicate that certain words must be moved to that position. The Localizer can be a non visible word, and can be based on non alphabetic characters.
2. When words are moving, a replica of the words that must be moved is created, and they are placed on the right of the Localizer.
3. An attribute of the words that were just created is modified, in order to indicate that these words are replicas. This is performed by modifying the attribute called "Copy".
4. The original words are hidden, and they remain in their original position.

A difficult problem that exists when moving words is how to coordinate different Move actions that are applied upon the same words. In order to solve this problem, in the preferred embodiment, the modification that is applied to the attribute "Copy" is based on adding the index of the Relation that is applied in each case to the value that that attribute might have before, and adding also a dot to separate the new text that is now added. The index might be for example, the number "1" for a Relation whose index is "1".

For example, if the current value of the attribute "Copy" is "3.1.0", this indicates that these words have bee moved by the Relations "1" and "3", in that order; the character "0" that remains is the default value for those words that have not been replicated. If any of these words is now moved by the Relation "4", the new value for the attribute would be "4.3.1.0".

Exhibit 13 shows how to carry out the "Move" Action for a Relation that basically contains that Action. The column titled "Closed Extract" shows a simplified version of how the Closed Extracts would evolve in the preferred embodiment. In this simplified version only some attributes are shown: "Visible", "Copy" and "Content". Moreover, the word marks have been inserted into the attribute "Content". The values of the attribute "Visible" are "s" and "n", where "s" means "visible" and "n" means "non visible". The values of the attribute "Copy" are chains of numbers that are separated by dots. If the value is "0", it means that that word is original and that it is not the result of a replication. If the value are several numbers, there will exist dots that will separate them, and that will mean that this word is the result of performing as many replications as the quantity of numbers that exist, except for "0".

As can be seen in the Exhibit, in several of the steps there exist words that are not visible. In these cases, the value of the attribute "Visible" is "n". In order to facilitate the exposition of the process, the contents of the words that are visible will be shown in bold font.

As can also be seen, there exist two localizers. Which Localizer belongs to which Relation is not indicated, but the Localizer for Relation 1 is [+] and the Localizer for the Relation 2 is [@].

It can be seen that every time that a "Move" Basic Action is executed, the original words are hidden, and a replica of those words is created that is placed at the right of the appropriate Localizer.

It can also be observed that the "Copy" attribute of the word "Juan" which is visible in the fifth step has two codes, because it has been displaced twice. If we want to displace it to the position that would correspond to it if the displacement of Relation 2 had not been executed, the following must be done. First, it is necessary to find another word that has the same code as "Juan" and that has the same values in the attribute "Copy", except for the number "2". (In this case, the codes of the words have not been shown, but given that there exists only one word whose content is "Juan" in the Original Extract, it is obvious that the word that is being sought is the second "Juan" in the Closed Extract of step 5).

It is necessary now to explain a topic related to the function Jump, in the modality of Response 2. As can be observed in the Exhibit, in step 3 there exist two characters "@", and none of them is visible. If in these circumstances the user selects a text fragment that contains the word of the character "@" whose "Copy" value is "0", this word would not become visible, because it is a word that has been moved to a different location. However, if the text fragment contains the word of the character "@" whose "Copy" value is "1.0", this word would become visible. That is to say, in "Move" Actions, there always exists a group of words which are the last ones that have been replicated, even if they are not visible. These words are the words that would become visible with the function Jump.

Exhibit 13

Original Extract: Es estupendo que venga Juan.
(Is great that come John)

| Step | Configuration | Open Extract | Closed Extract |
|---|---|---|---|
| 1 | Relation 1, Level 0. | Es estupendo | <n\|0\|[+]> <s\|0\|Es> <s\|0\|estupendo> |
|   | Relation 2, Level 0. | que venga | <s\|0\|que> <n\|0\|[@]> <s\|0\|venga> |
|   |   | Juan | <s\|0\|Juan> |
| 2 | Relation 1, Level 1. | [+] es | <s\|0\|[+]> <s\|0\|es> <s\|0\|estupendo> |
|   | Relation 2, Level 0. | estupendo que | <s\|0\|que> <n\|0\| [@]> <s\|0\|venga> |
|   |   | venga Juan | <s\|0\|Juan> |
| 3 | Relation 1, Level 2. | Que venga | <n\|0\|[+]> <s\|1.0\|Que> <n\|1.0\|[@]> |
|   | Relation 2, Level 0. | Juan es | <s\|1.0\|venga> <s\|1.0\|Juan> <s\|0\|es> |
|   |   | estupendo | <s\|0\|estupendo> <n\|0\|que> <n\|0\|[@]> |
|   |   |   | <n\|0\|venga> <n\|0\|Juan> |
| 4 | Relation 1, Level 2. | Que [@] | <n\|0\|[+]> <s\|1\|Que> <s\|1.0\|[@]> |
|   | Relation 2, Level 1. | venga Juan es | <s\|1.0\|venga> <s\|1.0\|Juan> <s\|0\|es> |
|   |   | estupendo | <s\|0\|estupendo> <n\|0\|que> <n\|0\|[@]> |
|   |   |   | <n\|0\|venga> <n\|0\|Juan> |
| 5 | Relation 1, Level 2. | Que Juan | <n\|0\|[+]> <s\|1\|Que> <n\|1\|[@]> |
|   | Relation 2, Level 2. | venga es | <s\|2.1.0\|Juan> <s\|1.0\|venga> <n\|1.0\|Juan> |
|   |   | estupendo | <s\|0\|es> <s\|0\|estupendo> <n\|0\|que> |
|   |   |   | <n\|0\|venga> <n\|0\|Juan> | of Original Extracts and Modified Extracts that might be shown to the user learner by a system that might be based on a paper support, such as a book, or based on a TV. In this case the interaction possibilities would not exist, but the possibilities to create and manage modified versions, provided by the invention would still remain.

In a different possible embodiment, the Tool and the Application are connected by some transmission means, such as for example Internet, and the texts and Extracts are sent by that means.

There exists a plurality of other alternative embodiments that will not be explained in order not to add complexity to the exposition.

Regarding Relational Schemes, in addition to the Schemes that were described in the previous section, there might exist many other types, some of which are described next.

Exposition of Other Alternative Embodiments
General

In a possible alternative embodiment, the computerized systems might not contain a mouse or a keyboard, and the interaction by the tutor or by the user learner might take place through a different means, such as for example with a tactile screen or with an optical pen. Moreover, either the mouse or the keyboard might be missing, and the interaction might be carried out with the device that would remain.

Other form to embody the invention is one in which the modified versions are generated by the tutor utilizing the Tool, and the Application is a non computerized system. The human tutor or an automatic tutor might generate sequences Relational Schemes of type "Special Association". In a similar way as happens with the Relational Schemes of plain Association type, these schemes also have the purpose to show the user learner that there exist different parts in the sentence that are directly related to each other. This Relational Scheme has been created for soft personal pronouns that perform the function of direct complement, indirect complement or beneficiary (in Spanish, soft pronouns are those pronouns that behave as clitics, such as "la" in "Juan la vió" [John her saw]). In this type of Relational Schemes there exist several subtypes. In order not to complicate the exposition, only one of the subtypes will be described. As can be observed, different characters are used in order to mark the groups of words that have some internal association.

Subtype "Special Association 1": This subtype is applied to soft pronouns that are performing the function of indirect complement or benefitiary. In the preferred embodiment, there exist six types of Relational Schemes that are based on this model, which are shown in Exhibit 14. The sentence that is used is an indirect object sentence, but a benefitiary sentence such as "Juan le ha pintado un cuadro a María" (John her has painted a painting to Mary) could also be used.

Exhibit 14

| Special Association 1.11 | Special Association 1.12 |
|---|---|
| 0. Juan le ha dado un libro a María (John her has given a book to Mary) 1. Juan ·le· ha dado un libro a María 2. Juan ·le· ha dado un libro 'a María' | 0. Juan le ha dado un libro (John her has given a book) 1. Juan ·le· ha dado un libro 2. Juan ·le· ha dado un libro (a María) |
| Special Association 1.21 | Special Association 1.22 |
| 0. Juan quiere darle un libro a María (John wants give-her a book to Mary) 1. Juan quiere dar·le· un libro a María 2. Juan quiere dar·le· un libro 'a María' | 0. Juan quiere darle un libro (John wants give-her a book) 1. Juan quiere dar·le· un libro 2. Juan quiere dar·le· un libro (a María) |
| Special Association 1.31 | Special Association 1.32 |
| 0. Juan quiere dárselo a María (John wants give-her-it to Mary) 1. Juan quiere dár·se·lo a María 2. Juan quiere dár·se·lo 'a María' | 0. Juan quiere dárselo (John wants give-her-it) 1. Juan quiere dár·se·lo 2. Juan quiere dár·se·lo (a María) |

Relational Schemes of type Direct Displacement: The purpose of this Relational Scheme is to directly displace a group of words to a different position, without showing the Localizer. Exhibit 15 describes how this Relational Scheme would be used.

Exhibit 15

| Direct Displacement 1 |
|---|
| 0. Los martes Juan trabaja en casa (The Tuesdays John words at home) 1. Juan trabaja en casa los martes |

Relational Schemes of type Double Displacement. The purpose of this Relational Scheme is to directly and simultaneously displace two groups of words. For example, it could be used for cases such as the one represented in Exhibit 16.

Exhibit 16

| Double Displacement 1 |
|---|
| 0. Entonces entró Juan (Then came John) 1. Juan entró entonces |

Relational Schemes of type Normal Displacement: The purpose of this type of Relational Schemes is to clarify the contribution to the sentence meaning of a word or a word group that is occupying a position that is different from the one that the learner would expect. Some previous examples have been based on this Relational Scheme. The Relational Schemes of this type have two activation levels. In Level 1, the only thing that is done is indicating the new position of the words that are involved. A Localizer is used for that. In Level 2, the words that are involved get moved. In general, the Localizer is implemented with a character that is not alphanumeric. There are several Relational Schemes that have this type, and Exhibit 17 shows three of them.

Exhibit 17

| Normal displacement 1 |
|---|
| 0. Ha preguntado dónde vive Juan (Has asked where lives John) 1. Ha preguntado dónde [@] vive Juan 2. Ha preguntado dónde Juan vive |
| Normal displacement 2 |
| 0. Es bueno que venga Juan (Is good that comes John) 1. [+] es bueno que venga Juan 2. Que venga Juan es bueno |
| Normal displacement 3 |
| 0. Es bueno comer verduras (Is good eating vegetables) 1. [↑] es bueno comer verduras 2. Comer verduras es bueno |

The invention claimed is:

1. A system for helping the understanding of a target language by generating and presenting one or more modified versions for at least one sample of said language target, wherein said system comprises the following:
   a memory,
   a processing unit,
   a display,
   at least a closed extract stored in said memory, wherein said closed extract is a data set that contains references to the words of said sample, and optionally also references to additional words or localizers, wherein a localizer is a string of symbols, said string of symbols not being a word in said target language, at least two relations stored in said memory, wherein a relation is a data set that comprises the information required to perform one or more modifications upon said closed extract, computer executable instructions that allow said processing unit to:

activate at least one of said relations, wherein said activation applies to said closed extract the one or more modifications that are associated to said one relation, said application producing a second closed extract, this second closed extract being a modified closed extract, cause said processing unit to filter at least one of said closed extracts to create an open extract, said open extract being a text fragment in the target language optionally containing in addition one or more localizers, wherein an open extract that is produced after filtering a modified closed extract is one of said modified versions of said sample, present said open extract in said display, wherein at least one of said modified versions differs from said sample in one of the ways included in the following plurality of ways: it contains additional words, or it contains some of the same words in different order, or it contains localizers, so that presenting said one or more modified versions provides an aid to the user for understanding said sample.

2. A system as claimed in claim 1, wherein at least one of said relations comprises more than one activation level, so that different modifications are applied to one of said closed extracts when said relation is activated to different activation levels.

3. A system as claimed in claim 1, further comprising:

a list of modification types, wherein a modification type is an data entity that defines what modification would be performed upon one or more fragments of closed extracts, at least one relational scheme, wherein a relational scheme is a data set that performs as a template, said relational scheme containing at least two parts, the first one of said parts defining one of said modification types, and the second one of said parts being a variable that can be assigned to one fragment of said closed extracts, computer executable instructions that allow said processing unit to:

present said relational scheme in said display, detect a user action, said action assigning a specific fragment of said closed extract to said variable, and create a new relation, assigning said relational scheme and said fragment to said relation, so that this system provides an aid to the user to create new relations.

4. A system as claimed in claim 3, wherein at least one of said relational schemes comprises several different modification types.

5. A system as claimed in claim 3, wherein said list of modification types comprises one or more of the following modification types:

a "show" modification type, wherein applying this basic action upon a fragment of said closed extract makes said fragment to be visible when said filtering is applied to said closed extract, a "move" modification type, wherein applying this basic action upon a fragment of said closed extract modifies the resulting position of said fragment when said filtering is applied to said closed extract, a "mark" modification type, wherein applying this basic action upon a fragment of said closed extract applies a graphical marking upon said fragment when said filtering is applied to said closed extract.

6. A system as claimed in claim 1 further comprising computer executable instructions that allow said processing unit:

create a replica of at least one source fragment of said closed extract, insert said replica into an arbitrary position in said closed extract, assign an identifying code to said replica, and filter said blind extract to create an open extract, in such as way that said source fragment is not shown in said open extract, and said replica is shown in said open extract thereby giving the impression that said source fragment has been moved, wherein said identifying code allows to identify the different replicas that are created when, in a second step, said replica is used as source fragment and replicated.

7. A system as claimed in claim 1, further comprising computer executable instructions that allow said processing unit to:

associate one of said relations to one fragment of said extract activate said relation when the user performs an interaction action upon said fragment.

8. A method for helping the understanding of a target language by generating and presenting one or more modified versions for at least one sample of said target language, said method being executed upon a computer, said method comprising the following steps:

providing at least a closed extract stored in said computer, wherein said closed extract is a data set that contains references to the words of said sample, and optionally also references to additional words or localizers, wherein a localizer is a string of symbols, said string of symbols not being a word in said target language, providing at least two relations stored in said computer, wherein a relation is a data set that comprises the information required to perform one or more modifications upon said closed extract, activating at least one of said relations, wherein said activation applies to said closed extract the one or more modification that are associated to said one relation, said application producing a second closed extract, this second closed extract being a modified closed extract, filtering at least one of said closed extracts to create an open extract, said open extract being a text fragment in the target language optionally containing in addition one or more localizers, wherein an open extract that is produced after filtering a modified closed extract is one of said modified versions of said sample, presenting said open extract in said display, wherein at least one of said modified version differs from said sample in one of the ways included in the following plurality of ways: it contains additional words, or it contains some of the same words in different order, or it contains localizers, so that presenting said one or more modified version provides an aid to the user for understanding said sample.

9. A method as claimed in claim 8, wherein at least one of said relations comprises more than one activation level, so that different modifications are applied to one of said closed extracts when said relation is activated to different activation levels.

10. A method as claimed in claim 8, further comprising the steps of:
provide a list of modification types, wherein a modification type is a data entity that defines what modification would be performed upon one or more fragments of closed extracts,
providing at least one relational scheme, wherein a relational scheme is a data set that performs as a template, said relational scheme containing at least two parts, the first one of said parts defining one of said modification types, and the second one of said parts being a variable that can be assigned to one fragment of said closed extracts,
presenting said relational scheme in said display,
detecting a user action, said action assigning a specific fragment of said closed extract to said variable, and
creating a new relation, said creation-assigning said relational scheme and said fragment to said relation, so that this method provides an aid to the user to create new relations.

11. A method as claimed in claim 10, wherein at least one of said relational schemes comprises several different modification types.

12. A method as claimed in claim 8, wherein said list of modification types comprises one or more of the following modification types:
a "show" modification type, wherein applying this basic action upon a fragment of said closed extract makes said fragment to be visible when said filtering is applied to said closed extract,
a "move" modification type, wherein applying this basic action upon a fragment of said closed extract modifies the resulting position of said fragment when said filtering is applied to said closed extract,
a "mark" modification type, wherein applying this basic action upon a fragment of said closed extract applies a graphical marking upon said fragment when said filtering is applied to said closed extract.

13. A method as claimed in claim 8 further comprising the steps of:
creating a replica of at least one source fragment of said closed extract,
inserting said replica into an arbitrary position in said closed extract,
assigning an identifying code to said replica, and
filtering said blind extract to create an open extract, in such as way that said source fragment is not shown in said open extract, and said replica is shown in said open extract,
thereby giving the impression that said source fragment has been moved, wherein said identifying code allows to identify the different replicas that are created when, in a second step, said replica is used as source fragment and replicated.

14. A method as claimed in claim 8, further comprising the steps of
associating one of said relations to one fragment of said extract
activating said relation when the user performs an interaction action upon said fragment.

15. A non-transitory computer readable medium containing computer executable instructions that, when executed by one or more processors of a computer, allow said one of more processors to execute the following steps:
providing at least a closed extract stored in said computer, wherein said closed extract is a data set that contains references to the words of a language sample of a target language, and optionally also contains references to additional words or localizers, wherein a localizer is a string of symbols, said string of symbols not being a word in said target language,
providing at least two relations stored in said computer, wherein a relation is a data set that comprises the information required to perform one or more modifications upon said closed extract,
activating at least one of said relations, wherein said activation applies to said closed extract the one or more modification that are associated to said one relation, said application producing a second closed extract, this second closed extract being a modified closed extract,
filtering at least one of said closed extracts to create an open extract, said open extract being a text fragment in the target language optionally containing in addition one or more localizers,
wherein an open extract that is produced after filtering a modified closed extract is a modified version of said sample,
presenting said open extract in said display,
wherein said modified version differs from said sample in one of the ways included in the following plurality of ways: it contains additional words, or it contains some of the same words in different order, or it contains localizers,
so that presenting one or more modified versions helps the user to understand said sample, and said method provides an aid to the user for understanding said sample.

16. A non-transitory computer readable medium as claimed in claim 15, wherein at least one of said relations comprises more than one activation level, so that different modifications are applied to one of said closed extracts when said relation is activated to different activation levels.

17. A non-transitory computer readable medium as claimed in claim 15, wherein said computer executable instructions allow said one or more processor to further perform the following steps:
providing a list of modification types, wherein a modification type is a data entity that defines what modification would be performed upon one or more fragments of closed extracts,
providing at least one relational scheme, wherein a relational scheme is a data set that performs as a template, said relational scheme containing at least two parts, the first one of said parts defining one of said modification types, and the second one of said parts being a variable that can be assigned to one fragment of said closed extracts,
presenting said relational scheme in said display,
detecting a user action, said action assigning a specific fragment of said closed extract to said variable, and
creating a new relation, said creation assigning said relational scheme and said fragment to said relation,
so that this steps provides an aid to the user to create new relations.

18. A non-transitory computer readable medium as claimed in claim 17, wherein at least one of said relational schemes comprises several different modification types.

19. A non-transitory computer readable medium as claimed in claim 15, wherein said list of modification types comprises one or more of the following modification types:
a "show" modification type, wherein applying this basic action upon a fragment of said closed extract makes said fragment to be visible when said filtering is applied to said closed extract, a "move" modification type, wherein applying this basic action upon a fragment of said closed extract modifies the resulting position of said fragment when said filtering is applied to said closed extract, a "mark" modification type, wherein applying this basic action upon a fragment of said closed extract applies a graphical marking upon said fragment when said filtering is applied to said closed extract.

20. A non-transitory computer readable medium as claimed in claim 15, wherein said computer executable instructions allow said one or more processor to further perform the following steps:

creating a replica of at least one source fragment of said closed extract, inserting said replica into an arbitrary position in said closed extract, assigning an identifying code to said replica, and filtering said blind extract to create an open extract, in such as way that said source fragment is not shown in said open extract, and said replica is shown in said open extract, thereby giving the impression that said source fragment has been moved, wherein said identifying code allows to identify the different replicas that are created when, in a second step, said replica is used as source fragment and replicated.

* * * * *